Oct. 1, 1968

R. A. COX 3,403,843

BEARING BRACKET

Filed Dec. 27, 1966

INVENTOR.
ROBERT A. COX

BY Malcolm L. Moore
ATTORNEY

Oct. 1, 1968   R. A. COX   3,403,843
BEARING BRACKET

Filed Dec. 27, 1966   2 Sheets-Sheet 2

INVENTOR.
ROBERT A. COX

BY Malcolm L. Moore
ATTORNEY

United States Patent Office 3,403,843
Patented Oct. 1, 1968

3,403,843
BEARING BRACKET
Robert A. Cox, La Crosse, Wis., assignor to The Trane Company, La Crosse, Wis., a corporation of Wisconsin
Filed Dec. 27, 1966, Ser. No. 604,690
1 Claim. (Cl. 230—120)

ABSTRACT OF THE DISCLOSURE

A plurality of brackets, each consisting of a unitary, V-shaped member having two spaced apart legs of relatively thin cross section, are utilized to support a drive shaft bearing assembly on the inlet side of an axial flow fan. The brackets are arranged along radial lines with respect to the fan center, and the angular orientation of brackets and bracket legs is such that the leading edge of only one fan blade passes behind a bracket leg at a given instant.

Background of the invention

This invention relates to bracket means for supporting a drive shaft bearing assembly of an axial flow fan. The use of support struts or brackets which extend across the path of air flow through such a fan unavoidably results in increased air turbulence and concomitant additional noise. Bracket members located upstream of an axial flow fan create trailing wakes as the air flows over them, and as the fan blades cut through these wakes a noise above and beyond that of the normal fan noise is generated. If the load to be carried by a bearing located on the upstream side of a fan wheel is of sufficient magnitude, as it normally would be on a relatively large size vane axial fan, the designer is faced with a problem of providing a bearing support structure which has sufficient strength and yet will not cause excessive turbulence in the entering air stream. To the best of my knowledge, present brackets utilized on such applications are designed to handle the bearing load but are not satisfactory from an air flow and noise standpoint. A strong, thick support strut will function nicely as a bearing support but may well cause a trailing wake of sufficient intensity to produce an undesirable change in the noise and performance characteristics of a fan.

Summary of the invention

I have designed a bracket so shaped and oriented with respect to the air entering an axial flow fan as to cause a very slight disturbance in the air stream while serving as a structurally strong support member for a bearing located in front of the fan. My improved bracket is comprised of a single, relatively thin member formed into a V-shape. The two legs forming the V function together to provide good strength and offer limited resistance to the flow of fan air. A plurality of such bearing brackets are utilized to support a bearing on the inlet side of an axial flow fan, the legs of the brackets being disposed radially with respect to the fan center. Where strength considerations require it, a cross brace is secured between the two legs of each bracket. These braces are so located along the bracket as to be positioned in that portion of the entering air stream which is flowing parallel to the fan axis. A further significant feature of my bracket arrangement resides in the particular angular spacing between separate brackets and between the legs of individual brackets. In order to avoid superimposing upon the basic fan sound wave an additional, high pitch noise of large intensity, the angular displacement between brackets and bracket legs is so selected as to prevent the simultaneous movement of two or more fan blades past different bracket legs.

These and other features and advantages of my invention will be readily understood as the following description is read in conjunction with the attached drawings.

Description of the preferred embodiment

Figure 1:
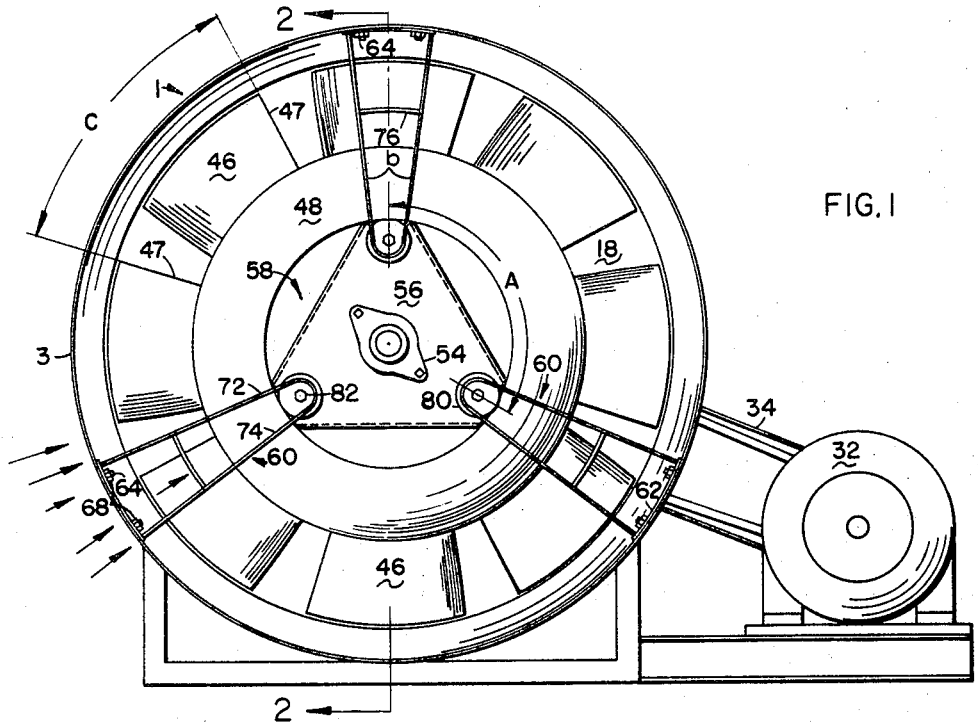
FIGURE 1 is a front elevation view of an axial flow fan incorporating my improved bearing bracket assembly.
Figure 2:
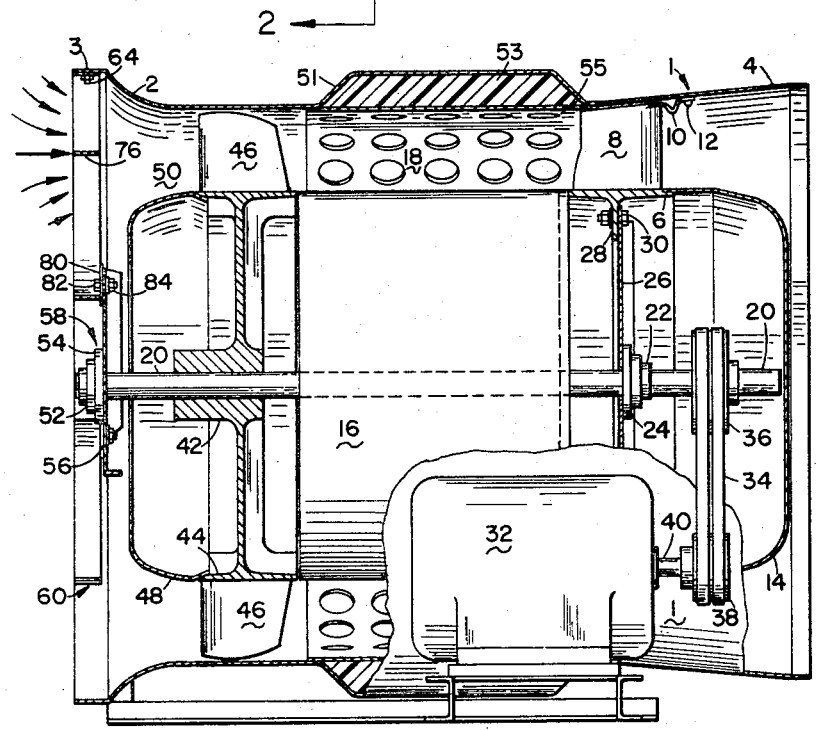
FIGURE 2 is a vertical section view taken along line 2—2 of FIGURE 1.

My improved support bracket is particularly adapted for use on an axial flow fan of the type shown in FIGURES 1 and 2. The fan assembly would normally include a tubular housing 1 having a bell-shaped air inlet flange 2 and a diffuser section 4 of increasing cross section. A stator assembly comprising a ring 6 and a plurality of stator vanes 8 extending outwardly therefrom is secured to the inside of diffuser section 4. This may be accomplished, for example, by means of forked clips 10 which fit over vanes 8 and are fastened to the wall of diffuser section 4 by screws 12 in the manner shown in detail in copending application Ser. No. 562,749, which has matured into Patent No. 3,346,174. Stator ring 6 supports rounded tail cap 14 and cylindrical air guide member 16 which cooperate with housing 1 to form an annular air flow passage 18.

Drive shaft 20 extending longitudinally within housing 1 is supported at one end by bearing 22, flanges 24 of which are bolted to bearing plate 26. Inwardly extending lugs 28 on stator ring 6 are drilled to receive mounting bolts 30 for bearing plate 26. Motor 32 drives shaft 20 by means of belts 34 which engage sheaves 36 and 38 mounted on drive shaft 20 and motor shaft 40 respectively.

Hub 42 of fan wheel 44 is secured to the forward end of drive shaft 20 for rotation therewith. The fan wheel assembly includes a plurality of blades 46 which extend outwardly from wheel 44 for rotation adjacent the inlet of annular space 18. Rounded nose cap 48 secured to fan wheel 44 cooperates with bell-shaped inlet flange 2 to form a smoothly contoured air inlet zone 50. Housing 1 is offset at 51 immediately downstream of fan blades 46 in order to provide a recess which is filled with sound absorbing fibrous material 53. Cylindrically shaped perforated plate 55 covers recess 51 and holds material 53 in place.

A second bearing 52 serves to rotatably support drive shaft 20 at its forward end. Bearing 52 is secured to bearing plate 56 by bolts passing through flange portions 54. Bearing plate 56 and bearing 52 form a front bearing assembly generally designated 58 which is held in place by a unique bracket arrangement which is the subject of my invention. Any struts or support arms positioned on the upstream side of fan wheel 44 will necessarily cause some turbulence in the incoming air. My novel brackets are so designed and positioned as to present a minimum obstruction to the flow of inlet air while at the same time providing adequate support for front bearing assembly 58. As is indicated in FIGURE 1, I have provided a tripod type of bearing assembly support utilizing three equally spaced brackets 60 with their centerlines located 120° apart. Each bracket 60 has an arcuately shaped base 62 which is shaped to conform to cylindrical, duct connection flange 3 at the forward end of housing 1. Spaced apart holes 66 (FIGURE 3) in each bracket base 62 slip over mating studs 64 welded to the inside of flange 3 and are secured thereto by nuts 68.

Figures 3, 4:
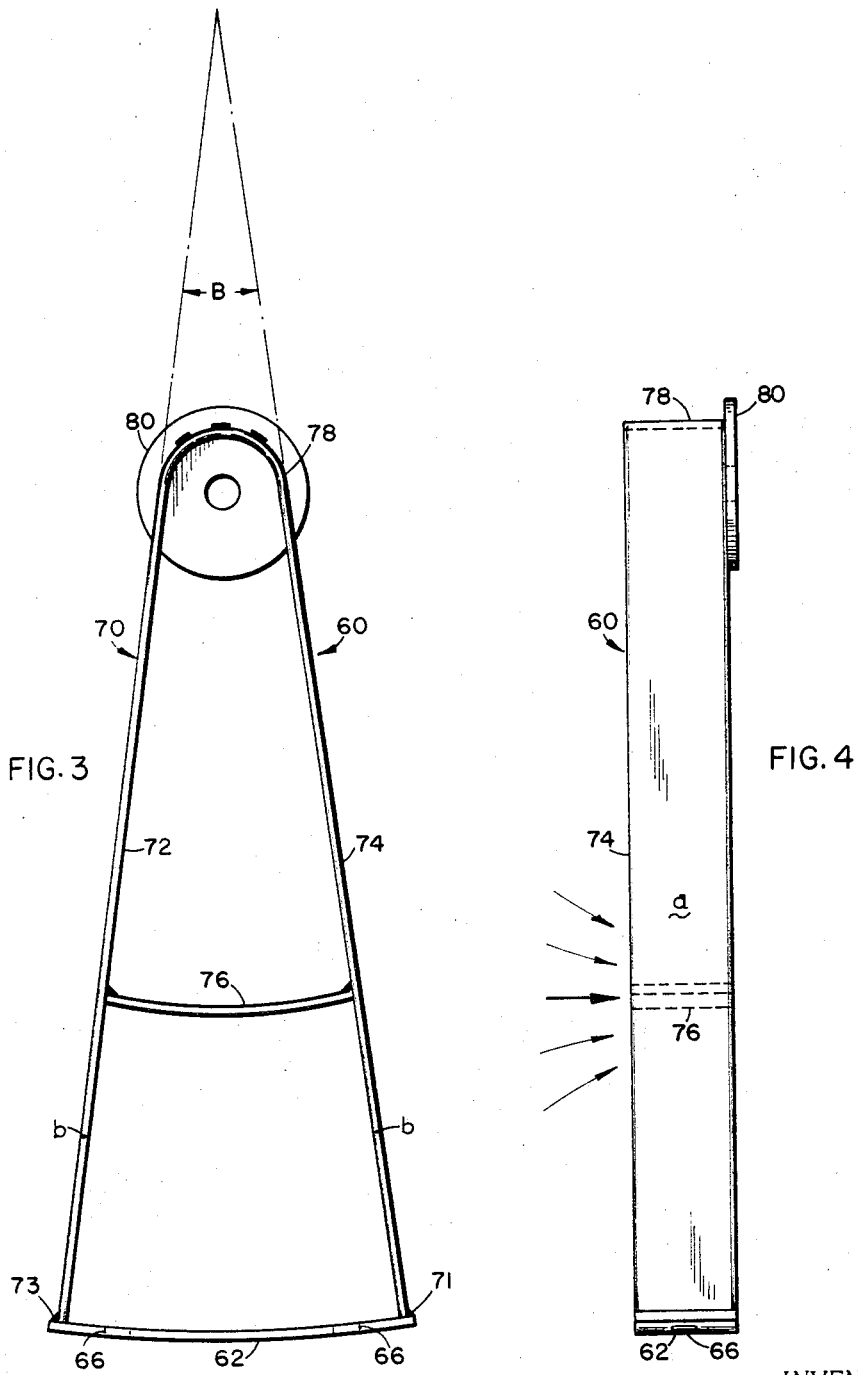
FIGURE 3 is an enlarged front elevation view of my improved bracket.
FIGURE 4 is a side elevation view of the bracket of FIGURE 3.

With reference to FIGURES 3 and 4, the main body portion of each bracket 60 consists of a piece of steel bar stock 70 bent into a generally V-shaped configuration having side legs 72 and 74. Base 62 extends outwardly beyond the bottom of legs 72 and 74 in order to facilitate the making of weld joints 71 and 73 securing base 62 to bracket body piece 70. Brackets 60 may be reinforced intermediate their length by a brace 76 welded at its ends to legs 72 and 74. The curved top 78 of each bracket body piece 70 is welded to a washer 80, the latter facilitating the connection of brackets 60 to bearing plate 56. To this end, washers 80 are secured to bearing plate 56 by bolts and nuts 82 and 84 as indicated in FIGURES 1 and 2.

There are several features of the design and disposition of brackets 60 which particularly contribute to the minimum effect which they have on air flow. In the first place, bracket body piece 70 is manufactured from relatively thin cross section steel bar stock so that legs 72 and 74 create a small trailing wake as the air flows into fan wheel 44. Furthermore legs 72 and 74 have rounded edges $b$ in order to promote the smooth flow of air thereover. Secondly, as is apparent from an examination of FIGURE 1, bracket legs 72 and 74 are all arranged along lines which are radial with respect to the center of wheel 44. This insures that the entering air, which approaches blades 46 along radial lines as it streams over bell shaped inlet 2 and rounded nose cap 48, will flow parallel to bracket legs 72 and 74 and then over the narrow rounded edges $b$ thereof as it turns axially into housing 1. This flow of air substantially parallel to rather than transversely of the relatively wide face $a$ of bracket legs 72 and 74 is shown by flow arrows in FIGURES 1 and 4. Additionally, braces 76 are positioned at a point outwardly along the length of brackets 60 where the air flow is parallel to the axis of fan wheel 44, as is indicated by flow arrows in FIGURES 2 and 4. Thus braces 76 offer a minimum restriction to the incoming air.

Finally, the included angle B (FIGURE 3) between bracket legs 72 and 74 is held within a particular range because of strength and noise considerations. With respect to the noise problem, it is to be noted initially that fans of the type shown unavoidably create a certain amount of noise as the air flows over the fan blades 46. Fan blades rotating in an undisturbed inlet air stream generate a sound at what is commonly referred to as blade frequency, which is directly proportional to the number of blades and the rotor speed. As the blades pass through the wake behind a stator, support strut or obstruction of any kind in the entering air stream, the pressure distribution along each blade is altered, thus causing an additional noise. Where more than one strut is located upstream of the fan, as is the case with the plurality of brackets 60 required to support bearing assembly 58 of my fan design, the noise problem becomes much more serious. I have noted that if the leading edge 47 of more than one blade 46 starts to cut through the wake behind more than one bracket leg 72 or 74 at the same instant, the simultaneous flow disturbances create a single, loud whine which is especially objectionable on air conditioning applications. This is due to the fact that the wake disturbance noises occurring simultaneously at different blades are in phase, and act together to greatly magnify the amplitude of the blade frequency sound wave emitted by the fan. In order to avoid this multiplier effect, the angular orientation of legs 72 and 74 of brackets 60, and the number and spacing of fan blades 46 must be such that only one blade starts to pass behind a leg 72 or 74 at any given instant of fan rotation. Assuming uniform spacing of brackets 60, this condition is met when the following relationships are maintained between rotor blades and bracket legs;

$$B \neq C$$

and $$\frac{A-B}{C} \neq \text{a whole integer}$$

wherein A is the included angle between the centerlines of adjacent brackets 60, B is the included angle between the legs 72 and 74 of a single bracket 60, and C is the angular spacing between adjacent leading edges 47 of blades 46. In the embodiment of my invention shown, A is 120° and there are eight evenly spaced rotor blades 46. Determining angle C between adjacent leading edges 47 by the formula;

$$C = 360°/N$$

where N equals the number of blades, C is equal to 45° for an eight bladed rotor. The expression $B \neq C$ will thus be met by simply selecting a value other than 45° for angle B. This is necessary to avoid having the leading edges 47 of two adjacent blades 46 coincide with legs 72 and 74 of a particular bracket 60 at the same time. With these particular values of A and C known, the angle B may now be selected so that the arithmetic expression $$\frac{A-B}{C}$$

does not equal a whole integer. A value of 25° for B satisfies these requirements, and also insures that V-shaped brackets 60 will have the required strength. There are larger values of B which would also establish the aforesaid necessary relationships between rotor blades and bracket legs. However, an angle B less than 25° has proven to simplify manufacturing procedures.

The factors of strength and noise also dictate a minimum value for angle B. If legs 72 and 74 are too close together, the noise problem may be compounded by interference between the wakes from these adjacent legs on a single bracket 60. Also an extremely small angle B between legs 72 and 74 would tend to lessen the beneficial strength effects achieved by using a V-shaped bracket 60. I have found that these strength and noise factors are satisfactorily accounted for by limiting angle B to a minimum value on the order of 15°.

By employing brackets 60 shaped and located as aforesaid, I have been able to cope with the conflicting problems of bearing support and noise control quite satisfactorily. V-shaped brackets 60 having their legs 72 and 74 arranged radially with respect to the fan axis act as strong structural members while at the same time presenting only elements of relatively thin cross section to incoming air. Single struts of relatively large cross section could be used in place of my brackets 60 to adequately support bearing assembly 58. However, they would create relatively large leaving wakes and the resultant noise increase would be severe compared with that produced by my bracket arrangement. There are of course other combinations of numbers of fan blades 46 and brackets 60 which would be suitable from a noise standpoint as long as the blade and bracket arrangement meets the aforesaid condition of not permitting more than one blade leading edge to start passing through the wake behind a bracket leg at one time.

I do not intend that my invention be limited to the particular embodiments shown and described, which are illustrative only. Variations may occur to those skilled in the art which will be within the spirit and scope of my invention as defined by the following claim.

I claim:

1. Fan apparatus comprising: a tubular housing; a drive shaft extending longitudinally within said housing coaxially therewith; an axial flow fan mounted on said drive shaft, said fan having a plurality of blades; means rotatably supporting said drive shaft; and bracket means extending between said last mentioned means and said housing, said bracket means comprising a plurality of spaced apart, unitary bracket members of thin cross section, each of which is bent into a V-type configuration with two angularly displaced legs, said legs being so positioned as to have a thin edge extending across the path of air flow, the angular displacement between said bracket members and between each pair of said legs being of such a value with respect to the angle between the leading edges of adjacent ones of said blades that not more than one of said blades starts to rotate past one of said legs at a given instant.

References Cited
UNITED STATES PATENTS

| | | | |
|---|---|---|---|
| 2,191,341 | 2/1940 | Curley | 230—120 |
| 339,030 | 3/1880 | Smith | 230—120 |
| 1,502,862 | 7/1924 | Merk | 230—120 |
| 2,108,703 | 2/1938 | Bentley | 230—120 |
| 2,130,910 | 9/1938 | Smith | 230—120 |
| 2,225,412 | 12/1940 | Ferling | 230—235 |
| 2,169,232 | 8/1939 | Flanders | 230—120 |
| 2,540,968 | 2/1951 | Thomas | 230—120 |
| 2,690,294 | 9/1954 | Cary | 230—120 |

HENRY F. RADUAZO, *Primary Examiner.*